United States Patent Office 3,276,099
Patented Oct. 4, 1966

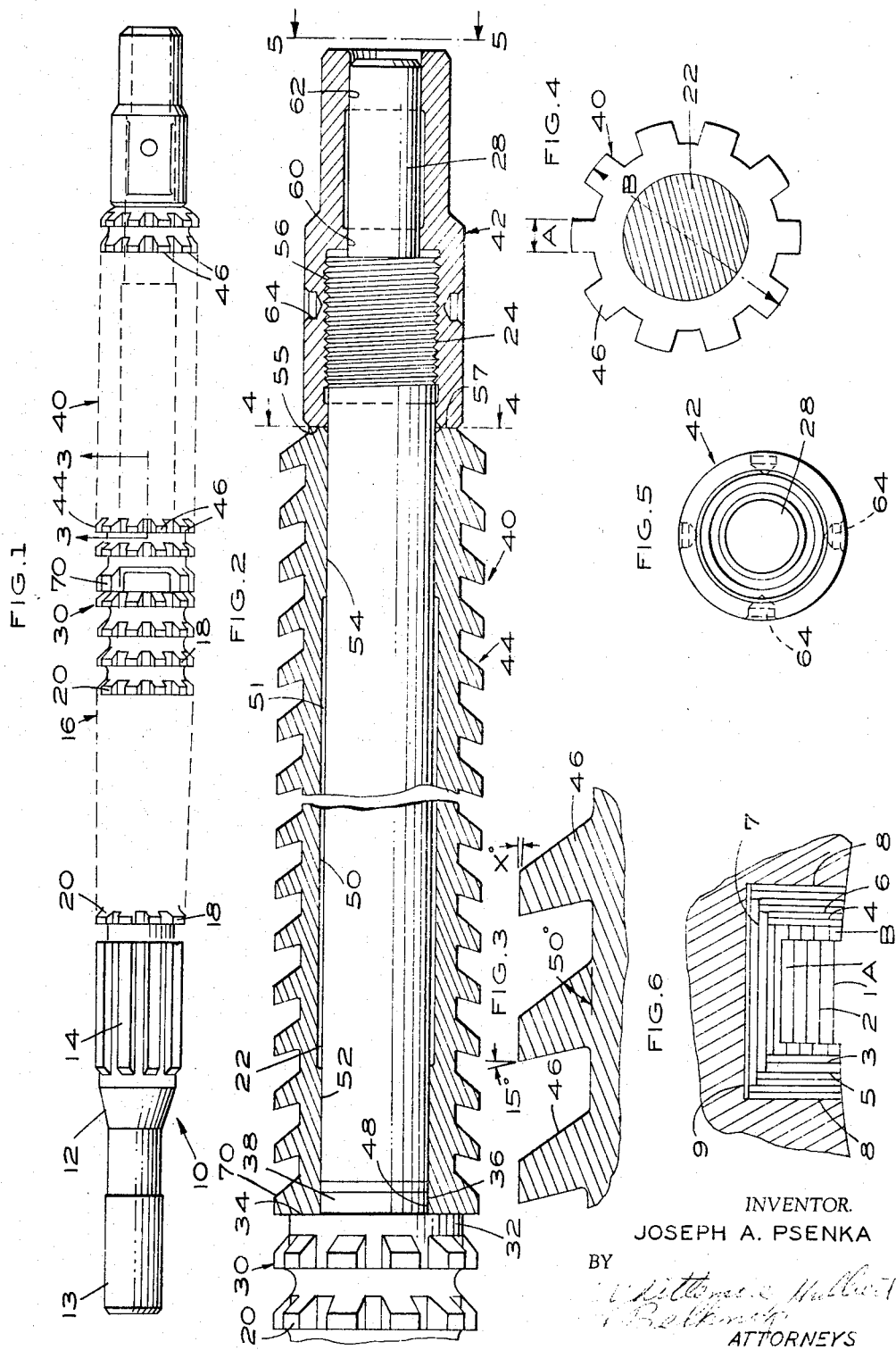
Oct. 4, 1966  J. A. PSENKA  3,276,099
CONCENTRICITY BROACH
Filed June 22, 1964
INVENTOR.
JOSEPH A. PSENKA
BY
ATTORNEYS

3,276,099
CONCENTRICITY BROACH
Joseph A. Psenka, Bloomfield Hills, Mich., assignor to National Broach & Machine Company, Detroit, Mich., a corporation of Michigan
Filed June 22, 1964, Ser. No. 376,929
15 Claims. (Cl. 29—95.1)

The present invention relates to a finishing broach and more particularly, to a broach assembly comprising a plurality of sections a leading one of which is a roughing section adapted to rough out, or finish roughing out, the teeth of an internal gear or splined element, and a following section which is a finishing section adapted to finish the teeth of the workpiece with extreme accuracy as regards to profile, size and more particularly concentricity. The finishing teeth of the broach are constructed and shaped so that the pitch diameter or form and the major diameter broach or cut the workpiece with assured concentricity.

In the broaching of internally toothed members such as internal gears, spline members or the like, it is desirable to produce broaching elements having substantially any required degree of accuracy. However, in use such a broaching element can reproduce itself with substantial accuracy only when it is not subjected to negative factors which are occasioned by an earlier stage of a broaching operation and are more fully explained in my copending application U.S. Serial No. 89,424 entitled "Broach," filed February 15, 1961, now abandoned.

The present invention relates to a broach which has a roughing section and a finishing section which can either be an integral part of the broach, in other words, a solid one-piece broach, or have a replaceable finishing shell which is affixed to and located on the rear end of the broach body following the roughing section, such as disclosed in my Patent 2,987,801. Certain aspects of the invention may be embodied in a finishing broach construction, whether formed as a part of a broach including the finishing construction, or formed as a separate broach. It will be appreciated also that the cutting teeth of the broach may be arranged in axial alignment if the broach is for the purpose of producing splines or gears with zero degree helix angle (spur), or arrranged in helical alignment if the broach is for the purpose of producting helical teeth.

During the rapid development of the broaching art, it has always been the ultimate goal of the industry to provide for concentricity of the major diameter of the broach part with the pitch or form diameter regardless of whether the form of the broach be an involute spline, straight-sided spline, angular spline, or a special form spline, either helical or spur. Although it has always been the objective in the industry to obtain concentricity in the broached part between the major diameter and form, the ultimate objective has not been obtained. The present invention arranges the finishing teeth of the broach in a predetermined manner or sequence to assure concentricity of the elements of the workpiece.

It is an object of the present invention to provide a broach which obtains the desired concentricity in the broached part between the pitch diameter or form and the major diameter.

Another object of the present invention is to provide a broach of the character described in which the finishing portion of the broach is provided with a plurality of series of accurately formed longitudinally aligned alternate finish top and side cutting teeth, said finish cutting teeth being arranged in laterally aligned groups or units which comprises alternate groups of top cutting teeth and side cutting teeth, the top cutting teeth in each series being of definitely predetermined increasing height in the rearward direction, with the width of each of the top cutting teeth in a series being smaller in width than the preceding side cutting tooth in the same series to have side clearance with respect to the workpiece, the side cutting teeth in each series being of definitely predetermined progressively increasing width in the rearward direction, with the height of the side cutting teeth on each of the corresponding groups being of less height than the preceding group of top cutting teeth, corresponding edges at both sides of each of the side cutting teeth being circumferentially stepped and shaped so as to cause each of the side cutting teeth to cut entirely at the sides thereof, with the sides of each of the side cutting teeth cutting simultaneously in the workpiece throughout substantially their entire height.

Still another object of the present invention is to provide a broach of the aforementioned type in which the finish top and side cutting teeth have side clearance in back of the cutting edges.

A further object of the present invention is to provide a broach of the aforementioned type wherein the finishing teeth are located on a shell which is connected to and follows a roughing section of the broach.

It is thus another object of this invention to provide a simplified low cost structure of the aforementioned type having certain advantages contributing to efficiency, reliability and long life as well as ease of maintenance.

Further objects and advantages of the present invention will be apparent from the following description, reference being had to the accompanying drawing wherein a preferred form of the present invention is clearly shown.

FIGURE 1 is a side elevation of the broach assembly.

FIGURE 2 is an enlarged fragmentary sectional view through the trailing end of the broach assembly.

FIGURE 3 is a side elevation showing the profile of adjacent teeth in the finishing section taken on the line 3—3 of FIGURE 1.

FIGURE 4 is a view partly in section taken on the line 4—4 of FIGURE 2.

FIGURE 5 is an end view looking in the direction of arrows 5—5 of FIGURE 2.

FIGURE 6 is a diagrammatic view of a tooth space in a workpiece showing the sequence of cuts taken by the teeth of the roughing and finishing sections of the broach shown in FIG. 1.

Initially a roughing broach, not shown, is pulled through a hole in the workpiece to partially rough out and form the toothed elements therein as is well known in the art. After the first pass of the roughing broach has been made through the workpiece a second pass is made with the broach assembly 10 illustrated in FIGURE 1, to complete the roughing operation and to final finish the teeth.

The broach 10 comprises a leading and roughing section 12 provided on the leading end thereof with a head 13 adapted to be connected to a suitable device for pulling the broach 10 through a hole in the workpiece, the teeth of which were previously partially roughed out by the roughing broach. In order to guide the broach 10 through the previously broached workpiece, a plurality of longitudinally extending, circumferentially spaced pilot splines 14 are provided adjacent the head 13. Conveniently, the roughing section of the broach 10 as indicated generally at 16 in FIGURE 1, includes a series of progressively stepped blades 18, the blades 18 being interrupted as best seen in FIGURE 2 to form separate cutting teeth 20. It will be appreciated that the cutting teeth 20 are arranged in axial alignment if the broach is for the purpose of producing spur teeth, or in helical alignment if the broach is for the purpose of producing helical teeth. The term "longitudinal alignment" or the like is intended to cover arrangements for both the spur and helical arrangements of the teeth. At the following end of the roughing section 12 of the broach assembly 10 is a cylindrical support 22 having a threaded portion 24 which is utilized for a purpose which will subsequently appear. Rearwardly of the threaded portion 24 the cylindrical support 22 is reduced in diameter as indicated at 28.

Directly in rear of the final toothed blade 30 of the roughing section 16 there is a cylindrical surface 32 opposite sides of which are machined away as indicated to form rearwardly facing flat abutment surfaces 34 and radially outwardly facing flat surfaces 36. This arrangement provides a flat transversely extending key 38.

As seen in FIGURE 2, the following finishing broach section or shell 40 is assembled on the cylindrical support 22 of the leading section 12 and is retained thereon in assembled relation by a nut 42 threaded to the threaded portion 28 of the roughing or leading broach section 16. The detailed construction of the finishing section 40 is best seen in the sectional enlargement of FIGURE 2 and the end view of the finishing section seen in FIGURE 4. The finishing section or shell 40 is essentially tubular in shape having toothed cutting blades 44 forming longitudinally aligned series of cutting teeth 46. Again, the cutting teeth 46 extend in axially disposed series if the broach 10 is to form a spur member, and the series are helically aligned if the broach 10 is used to produce helical teeth on the workpiece. As an example, at its leading end, the finishing section 40 is provided with a notch or keyway 48 extending diametrically across the leading end thereof and dimensioned to receive the key 38 at the following end of the roughing section 16 of the broach 10. The finishing section or shell 40 is provided with a central opening 50 the intermediate portion of which is enlarged to provide clearance as indicated at 51 and the ends of which are of slightly reduced size to provide the guide surfaces 52 and 54 which are guidingly received on the cylindrical outer surface of the cylindrical support 22 of the roughing section 16 of the broach.

It will be observed that the nut 42 in assembly has its forward end 55 engageable with the annular shoulder 57 provided on the extreme end of the shell 40. The nut 42 is threaded at 56 and threadedly engages the threaded portion 24 of the roughing section 16 of the broach. At its rear end the nut 42 is provided with a pair of cylindrical surfaces 60 and 62 which are adapted to snugly engage the reduced end portion 28 of the roughing section 16 of the broach. The outer surface of the nut 42 is provided with four circumferentially spaced holes 64 for engagement by a suitable tool such as a spanner wrench.

The nut 42 as is indicated in FIGURE 2 is threadedly connected to the threaded portion 24 of the cylindrical support 22 and is rotated to a position so as to substantially clamp or fix the shell 40 against circumferential and axial movement. The abutment surface 55 provided on the nut 42 is effective to urge the shell 40 to the left as viewed in FIG. 2 so as to urge the leading end of the shell 40 against the abutment surfaces 34 provided on the roughing section 16. It should be appreciated that the broach 10 may be constructed and arranged to provide for a floating shell of the type described in my aforesaid patent.

The roughing teeth 20 provided on the leading section 16 are of substantially equal width, with the height of the teeth in each longitudinally aligned series progressively increasing in height in the rearward direction. As an example the teeth each have a width of .3835", with the front pilot teeth having a width of .3825". As an example, the diameter of the first group of teeth is 2.319" while the diameter of the thirty-fifth group of teeth is 2.4935". The teeth in between the first and thirty-fifth group of teeth are each stepped in height .0051" in the rearward direction from the preceding tooth in each series. Four or five additional groups of teeth, each of approximately 2.4965" diameter are provided after the 35th group. The sides of the teeth are relieved so as to provide 1/32" straight at the top of all the roughing teeth.

The finishing teeth 44 are arranged in series which are in longitudinal alignment with the series of teeth 20 provided on the roughing section 16. The finishing teeth 44 are also arranged in laterally or circumferentially aligned groups or units, said units comprising alternate groups of top cutting and side cutting teeth which are constructed and arranged according to the following chart:

*Finishing shell*

| Tooth Number | Dimension "A" | Side Cutting (S.C.) | Dimension "B" | Top Cutting (T.) | Seq. |
|---|---|---|---|---|---|
| Front Pilot | .3815 |  | 2.491 |  |  |
| 1 | .3815 | N.C. | 2.493 | C. |  |
| 2 | .3828 | C. | 2.495 | C. |  |
| 3 | .3826 | N.C. | 2.4965 | C. |  |
| 4 | .3837 | C. | 2.4963 | N.C. | S.C. |
| 5 | .3846 | C. | 2.4963 | N.C. | S.C. |
| 6 | .3844 | N.C. | 2.4975 | C. | T. |
| 7 | .3854 | C. | 2.4973 | N.C. | S.C. |
| 8 | .3862 | C. | 2.4973 | N.C. | S.C. |
| 9 | .3860 | N.C. | 2.4985 | C. | T. |
| 10 | .3869 | C. | 2.4983 | N.C. | S.C. |
| 11 | .3876 | C. | 2.4983 | N.C. | S.C. |
| 12 | .3874 | N.C. | 2.499 | C. | T. |
| 13 | .3883 | C. | 2.4988 | N.C. | S.C. |
| 14 | .3889 | C. | 2.4988 | N.C. | S.C. |
| 15 | .3887 | N.C. | 2.4995 | C. | T. |
| 16 | .3894 | C. | 2.4993 | N.C. | S.C. |
| 17 | .3899 | C. | 2.4993 | N.C. | S.C. |
| 18 | .3897 | N.C. | 2.4999 | C. | T. |
| 19 | .3899 | C. | 2.4997 | N.C. | S.C. |
| 20 | .3897 | N.C. | 2.4999 | C. | T. |
| 21 | .3899 | C. | 2.4997 | N.C. | S.C. |
| 22 | .3897 | N.C. | 2.4999 | C. | T. |

N.C.=No cutting. C.=Cutting. T.=Top Cutting. S.C.=Side Cutting.

Due to the fact that the teeth in the last group of roughing teeth each have a width of .3835" and the diameter of said last group of roughing teeth is 2.4965", the front pilot and the first three groups of teeth of the finishing section or shell do not normally cut as is apparent from the above chart.

Referring to the above-identified chart, it should be observed that the front pilot teeth indicated by the numeral 70 in FIG. 2 are arranged in a group, said pilot teeth being tapered at the front end thereof to form a pilot section. The pilot section comprising the pilot teeth 70 follows the last group of teeth 30 provided on the roughing section 16 closely enough to insure continuous guiding action. The surfaces 34 are ground square to insure proper alignment with the roughing section.

It will appear from the above-identified chart that the teeth numbered 4, 5, 7, 8, 10, 11, 13, 14, 16, 17, 19, and 21 are side cutting teeth, with the top edges thereof not cutting. Thus the height of each side cutting tooth in each series is less than the preceding top cutting tooth. Both sides of each side cutting tooth cut in the workpiece simultaneously.

Teeth numbered 6, 9, 12, 15, 18, 20 and 22 are top cutting teeth, with the side edges thereof not cutting. It should be noted that each group of top cutting teeth, following one or more groups or units of side cutting teeth, are of less width than each tooth in the preceding side cutting group to have side clearance with respect to the workpiece.

The teeth of the finishing section are backed off as is indicated by the angle X in FIGURE 3. The amount of backoff will vary from ¼° to ½°, with the backoff extending down to the body diameter.

As mentioned previously, a roughing broach, not shown, makes a first pass through the workpiece to form an internally toothed element such as a gear. Thereafter, the broach of the present invention makes a second pass through the workpiece. It will be understood when referring to FIGURE 6 that the various numbered lines indicate cuts taken by succeeding teeth. Thus, it will be apparent that the first roughing broach tooth removes metal to form a shallow somewhat narrow groove somewhat narrower than the ultimate width of the groove, as shown by the line numbered 1. The next tooth takes a cut 2 of the same width but to a greater depth. For simplicity, the letter A is utilized to indicate the cuts taken by the roughing broach, not shown. Thereafter the roughing section 16 of the second broach, as illustrated in FIGURE 1, takes cuts which widens and deepens the groove, the various cuts of the roughing portion of the broach being designated by the letter B. Thereafter the finishing shell 40 moves through the workpiece, with the front pilot and the first three groups of teeth generally not cutting due to the fact that the height and width of the teeth provided therein is less than the last group of teeth on the roughing section 16.

Thereafter the fourth group of teeth passes through the workpiece to increase the width of the slot or groove as indicated by the lines 3 and 4. Next, the fifth group of teeth passes through the workpiece and cut on the sides thereof as indicated by the lines 5 and 6. The sixth group of teeth passes through the workpiece and cut only on the tops as indicated by the line 7. This procedure is repeated with generally two consecutive groups of side cutting teeth and then a single group of top cutting teeth passing through the workpiece so as to widen and then deepen the groove or slot respectively until finally the last group of side cutting teeth forms the groove to final width as indicated by the lines 8 and 8' and the last group of top cutting teeth forms the groove to final depth as indicated by the line 9.

As will readily appear from the above-identified chart, the shell 40 includes five sections (groups 4–18 inclusive), each section including two groups of side cutting teeth and a single group of top cutting teeth. Finally there are provided two sections (groups 19–22 inclusive), each section having a single group of side cutting teeth and a single group of top cutting teeth.

The unique construction of the broach, whether a straight sided spline broach or an involute broach or any other type of form broach, has provided a means for producing in the broach part concentricity between the major diameter and the form.

Although this invention has been described in connection with a shell type of broach, it should be understood that it could be utilized in connection with a solid type of broach. In addition, the invention is applicable to splines or gears with a zero degree helix angle (spur) or to helical broaches as well. While the tooth form illustrated is a generally parallel flat sided spline, the form of teeth may be as desired, including involute.

The drawing and the foregoing specification constitute a description of the improved broach in such full, clear, concise and exact terms as to enable any person skilled in the art to practice the invention, the scope of which is indicated by the appended claims.

What I claim as my invention is:

1. A broach comprising a leading roughing section having a plurality of series of longitudinally aligned cutting teeth arranged in laterally aligned groups, the cutting teeth in each series increasing in height in the rearward direction, a following finishing section having a plurality of series of accurately formed longitudinally aligned finish top and side cutting teeth interspersed in predetermined sequence and in longitudinal alignment with said plurality of series of teeth in said roughing section, said finish cutting teeth being arranged in laterally aligned groups which comprise groups of top cutting teeth and groups of side cutting teeth, said groups being interspersed in a predetermined sequence, the top cutting teeth in each series of the finishing section being of definitely predetermined increasing height in the rearward direction, with the width of each of the top cutting teeth in each series of the finishing section being less than the width of the preceding side cutting teeth of the same series to have side clearance with respect to the workpiece, the side cutting teeth in each series of the finishing section being of definitely predetermined progressively increasing width in the rearward direction, with the height of the side cutting teeth in each of the corresponding groups of the finishing section being less than the height of the preceding group of top cutting teeth, corresponding edges at both sides of each of said finish side cutting teeth being circumferentially stepped and shaped so as to cause each of said side cutting teeth to cut substantially entirely at the sides thereof, with the sides of each of said side cutting teeth cutting simultaneously in the workpiece throughout substantially their entire height.

2. A broach as defined in claim 1 in which the sequence of groups of side cutting and top cutting teeth is such that adjacent groups of either kind of cutting teeth are separated by no more than two groups of the other kind of cutting teeth.

3. A broach as defined in claim 1 in which the sequence of groups of side cutting and top cutting teeth is such that adjacent groups of top cutting teeth are separated by no more than two groups of side cutting teeth.

4. A broach as defined in claim 1 in which the sequence of groups of side cutting and top cutting teeth is such that adjacent groups of top cutting teeth are separated by not less than one nor more than two groups of side cutting teeth.

5. A broach as defined in claim 1 in which said finish top and side cutting teeth have cutting clearance in back of the cutting edges.

6. A broach as defined in claim 1 in which the teeth of the roughing section are of equal width.

7. A broach having at its trailing end a plurality of series of accurately formed longitudinally aligned finish top and side cutting teeth which constitute the final tooth cutting elements thereon, said finish cutting teeth being arranged in laterally aligned groups which comprise groups of top cutting teeth and side cutting teeth interspersed in a predetermined sequence, the top cutting teeth in each series being of definitely predetermined increasing height in the rearward direction, with the width of each of the top cutting teeth in a series being less than the width of the preceding side cutting tooth in the same series to have side clearance with respect to the workpiece, the side cutting teeth in each series being of definitely predetermined progressively increasing width in the rearward direction, with the height of the side cutting teeth in each of the corresponding groups being less than the height of the preceding group of top cutting teeth, corresponding edges at both sides of each of said side cutting teeth being circumferentially stepped and shaped so as to cause each of said side cutting teeth to cut substantially entirely at the sides thereof, with the sides of each of said side cutting teeth cutting simultaneously in the work piece throughout substantially their entire height.

8. A broach as defined in claim 7 in which the sequence of groups of side cutting and top cutting teeth is such that adjacent groups of either kind of cutting teeth are separated by no more than two groups of the other kind of cutting teeth.

9. A broach as defined in claim 7 in which the sequence of groups of side cutting and top cutting teeth is such that adjacent groups of top cutting teeth are separated by no more than two groups of side cutting teeth.

10. A broach as defined in claim 7 in which the sequence of groups of side cutting and top cutting teeth is such that adjacent groups of top cutting teeth are separated by not less than one nor more than two groups of side cutting teeth.

11. A broach as defined in claim 7 in which said finish top and side cutting teeth have cutting clearance in back of the cutting edges.

12. A finishing broach section having a plurality of series of accurately formed longitudinally aligned finish top and side cutting teeth which constitute the final tooth cutting elements thereon, said finish cutting teeth being arranged in laterally aligned groups which comprise groups of top cutting teeth and side cutting teeth interspersed in a predetermined sequence, the top cutting teeth in each series being of definitely predetermined increasing height in the rearward direction, with the width of each of the top cutting teeth in a series being less than the width of the preceding side cutting tooth in the same series to have side clearance with respect to the work piece, the side cutting teeth in each series being of definitely predetermined progressively increasing width in the rearward direction, with the height of the side cutting teeth in each of the corresponding groups being less than the height of the preceding group of top cutting teeth to have top clearance with respect to the work piece, corresponding edges at both sides of each of said side cutting teeth being circumferentially stepped and shaped so as to cause each of said side cutting teeth to cut substantially entirely at the sides thereof, with the sides of each of said side cutting teeth cutting simultaneously in the work piece throughout substantially their entire height.

13. A broach as defined in claim 12 in which the sequence of groups of side and top cutting teeth is such that adjacent groups of either kind of cutting teeth are separated by no more than two groups of the other kind of cutting teeth.

14. A broach as defined in claim 12 in which the final groups of teeth on the broach are alternated side cutting groups and top cutting groups.

15. A broach as defined in claim 12 in which said top and side cutting teeth have cutting clearance in back of the cutting edges.

No references cited.

HARRISON L. HINSON, *Examiner.*

WILLIAM W. DYER, Jr., *Primary Examiner.*